UNITED STATES PATENT OFFICE.

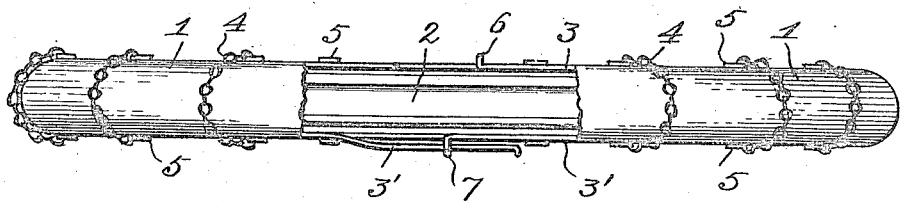
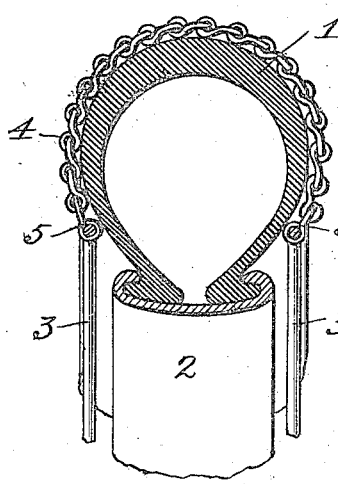
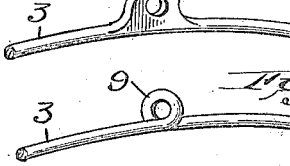
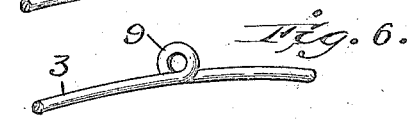
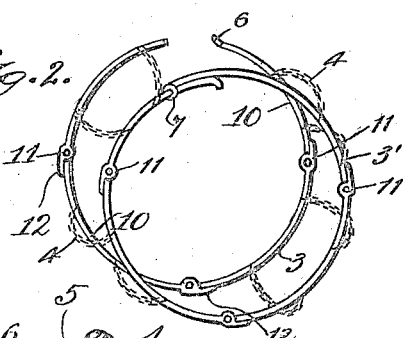
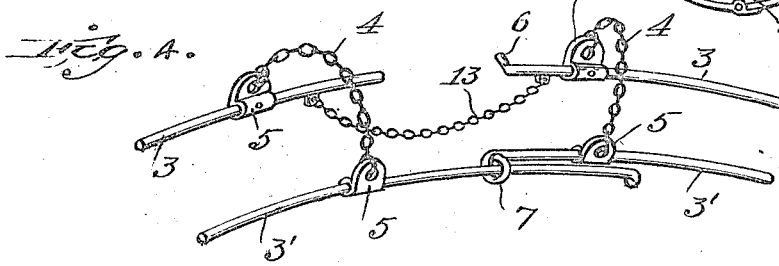

HENRY W. WALDEN, OF NEW YORK, N. Y.

ANTISKID DEVICE.

1,248,212.      Specification of Letters Patent.      Patented Nov. 27, 1917.

Application filed January 14, 1916. Serial No. 72,110.

*To all whom it may concern:*

Be it known that I, HENRY W. WALDEN, a citizen of the United States, residing at New York, in the borough of Manhattan and State of New York, have invented certain new and useful Improvements in Antiskid Devices, of which the following is a specification.

My invention relates to devices for automobiles, and has for its object to provide an improved construction of the same that is adapted readily to be positioned on or removed from the tire, and which when positioned will remain in place without the employment of any auxiliary fastening means.

The invention also embraces certain other minor novel details of construction, as will be hereinafter more definitely pointed out and claimed, reference being had to the accompanying drawing, in which:—

Figure 1 is an edge view of an automobile tire and its rim, showing my improved device in position thereon, said tire being partly broken away.

Fig. 2 is a perspective view of my improved device detached.

Fig. 3 is an enlarged transverse sectional view of said tire and rim.

Fig. 4 is a detail perspective view of a portion of my improved device.

Figs. 5 and 6 are similar detail views illustrating modified forms of the chain fastening wires or rings.

Similar numerals of reference denote corresponding parts in the several views.

In the said drawing the reference numeral 1 denotes a conventional automobile pneumatic tire, and 2 its rim. My improved antiskid device embraces two resilient rings 3, 3', one adapted to be disposed on each side of the tire 1, and the two being united by the cross chain sections 4, which constitute the anti-skid elements, said cross chain sections being attached to said rings through the lugs 5, which are riveted to position. The ring 3 on the inner side of the tire is a split ring, and when in position thereon has its ends separated somewhat, and has one of said ends out-turned at 6 to provide a grasping element, by which it may more readily be removed. The other ring 3' has its ends overlapped, one end being formed into an eye 7 to receive and guide the other end, though not limiting its longitudinal movement therein. And, as shown in Fig. 2, said rings each are formed in a plurality of segments 10, pivoted to each other at 11, and having lips 12 to limit their opening movement. Thus, the device as a whole may be collapsed when not in use, it being understood that the material of which said segments are formed is resilient.

In operation the device may be applied to a tire without jacking the same from the ground. The outer ring 3' is first brought into position against the outer side of the tire, and the inner ring 3 may then be sprung over the tire to position upon the inner side thereof, which will bring the chain sections 4 automatically to position, and said device may be applied even when the tire is partly embedded in mud or sand. That is to say, it may be applied to the exposed portion of the tire and will aid to extricate it from the mud or sand, and at the same time automatically will seat itself in position as the wheel turns.

In Fig. 4, I have shown attached near the ends of the split ring 3 a loose chain 13, the object of which is to limit the expansion of said split ring. That is to say, by employing this chain or other similar device it will be impossible for an inexpert manipulator of the device to expand said split ring unnecessarily, thereby destroying its resiliency.

In Figs. 5 and 6, I have shown two different modified forms of ring, the chain attaching eyes 8 of Fig. 5 being formed by flattening the ring, while the eyes 9 of Fig. 6 are formed by bending the ring.

In place of forming the rings 3—3' as shown, I contemplate forming the same in such manner that they will be elastic and they may be formed in any manner to accomplish this result, it being sufficient that they be capable of expansion and contraction.

Having thus described my invention, what I claim as new and desire to secure by Letters Patent, is:—

An anti-skid device for automobile tires, comprising a series of anti-skid members disposed at intervals transversely of the tire, and a pair of rings disposed parallel with the tire on opposite sides thereof, to which said members are attached, said rings each being formed of a plurality of segments hinged together, the hinges being provided with means to limit the opening movement of said rings.

In testimony whereof I have hereunto set my hand this 14th day of January 1916.

HENRY W. WALDEN.

Copies of this patent may be obtained for five cents each, by addressing the "Commissioner of Patents, Washington, D. C."